(No Model.)

D. C. KNOWLTON.
SHOE NAIL.

No. 310,161. Patented Dec. 30, 1884.

Witnesses:
C. E. Knowlton
Jas. V. Holbrook

Inventor:
D. C. Knowlton

UNITED STATES PATENT OFFICE.

DANIEL C. KNOWLTON, OF BOSTON, MASSACHUSETTS.

SHOE-NAIL.

SPECIFICATION forming part of Letters Patent No. 310,161, dated December 30, 1884.

Application filed May 12, 1881. (No model.)

*To all whom it may concern:*

Be it known that I, DANIEL C. KNOWLTON, of Boston, county of Suffolk, and State of Massachusetts, have invented certain new and useful Improvements in Shoe-Nails, of which the following is a specification, reference being had to the accompanying drawings, forming a part thereof.

This invention relates to an improvement on the nail shown by my Patent No. 236,167, and my object is to provide a shoe-nail of such construction as will prevent the head thereof from being pulled through the leather or other material into which it is inserted.

Figure 1:
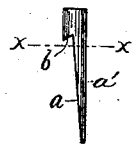
Figure 2:
Figure 3:

In the accompanying drawings, Figure 1 is a side elevation of my improved shoe-nail. Fig. 2 is a sectional view representing my nail securing two pieces of material together. Fig. 3 is a cross-section on the line $xx$, Fig. 1.

My nail is preferably formed from round wire, and is cut so that its shank, which is substantially half-round, has a beveled side, $a$, and a straight side, $a'$. The under side of the head, which is cylindrical, is undercut at $b$, thus forming a barb the line of which intersects the line of the beveled side $a$ of the shank at an acute angle. It is obvious that this construction gives the head a much stronger hold on the material than the construction shown by my Patent No. 236,167, in which the under and upper sides of the head are parallel.

As my improved nail is driven into the shoe, a portion of the material is compressed into the acute angular portion on the under side of the head, thus giving the barb a very strong hold on the stock into which it is driven, and preventing the head of the nail from drawing through the same, as sometimes occurs with nails as heretofore constructed.

Having thus described my invention, I claim as new and desire to secure by Letters Patent—

A shoe-nail the shank of which is formed substantially half-round, and with a straight and a beveled side, and the head of which is cylindrical and undercut to form a barb, the line of the latter intersecting the line of the beveled side of the shank at an acute angle, as hereinbefore set forth.

D. C. KNOWLTON.

In presence of—
 C. E. KNOWLTON,
 JAS. V. HOLBROOK.